June 3, 1969             B. S. MacCABE           3,447,688
STABILIZED EFFLUENT TROUGH FOR SETTLING TANKS OF
A CONTINUOUS FLOW SEWAGE TREATMENT PLANT
Filed July 3, 1967

INVENTOR.
BERNARD S. MacCABE
BY
Christy, Parmelee & Strickland
his
ATTORNEYS.

United States Patent Office 3,447,688
Patented June 3, 1969

3,447,688
STABILIZED EFFLUENT TROUGH FOR SETTLING TANKS OF A CONTINUOUS FLOW SEWAGE TREATMENT PLANT
Bernard S. MacCabe, Pittsburgh, Pa., assignor to Dravo, Pittsburgh, Pa., a corporation of Pennsylvania
Filed July 3, 1967, Ser. No. 650,765
Int. Cl. B01d 21/24; C02c 1/26
U.S. Cl. 210—242                     3 Claims

ABSTRACT OF THE DISCLOSURE

The effluent trough comprises a wholly enclosed hollow member having perforations in the side walls thereof and weighted to maintain the perforations below the liquid-air surface of the settling tank for continuous withdrawal of the clear effluent therein.

*Background of the invention*

The effluent trough is employed to continuously withdraw clear effluent from the settling tank of the continuous flow sewage treatment system for discharge from the system without withdrawal of solids within the tank.

*Summary of the invention*

The effluent trough of the invention comprises a hollow enclosure having perforated side walls and is weighted to normally maintain the perforations below the liquid-air surface of liquid in the settling tank and collects and discharges clear effluent from the tank. Preferably the trough is mounted upon a side wall of the tank for semi-rotary movement with the liquid-air surface within the tank and such mounting permits concurrent movement of the trough with the movement of the liquid-air surface of the effluent.

The primary object of this invention is to provide a novel form of effluent trough which is so constructed and stabilized to uniformly withdraw only substantially clear effluent from the settling tank under all conditions obtaining at the liquid-air surfacing of the settling tank.

Figure 1:
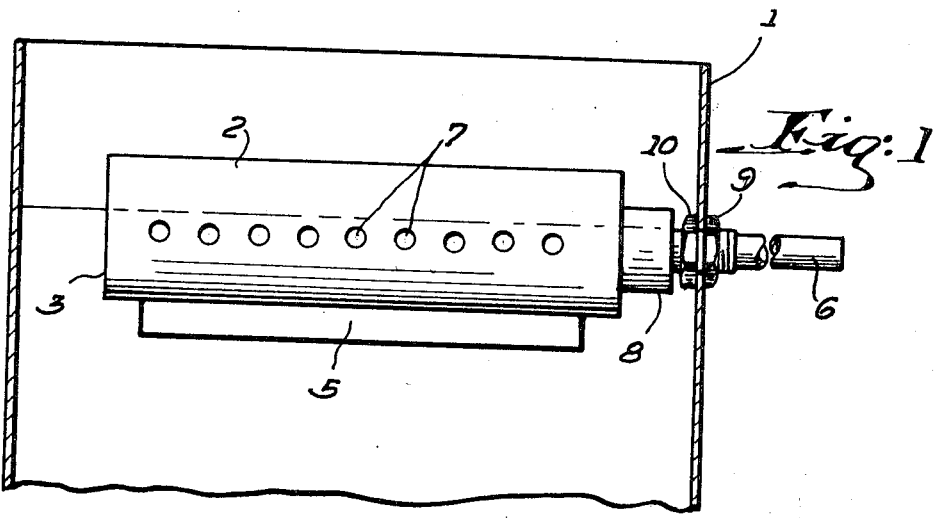
FIGURE 1 shows a vertical cross-section of a conventional circular settling tank of a continuous flow sewage treatment tank having the stabilized effluent trough of the invention mounted therein.
Figure 2:
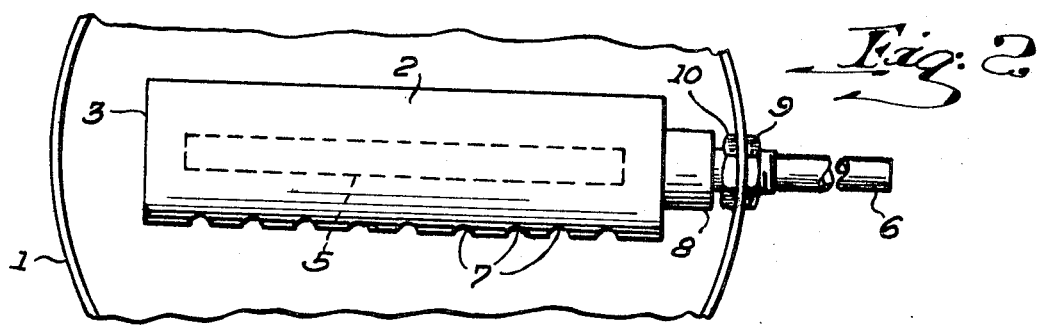
FIGURE 2 shows an enlarged plan view of the stabilized effluent trough of the invention.
Figures 3, 4:
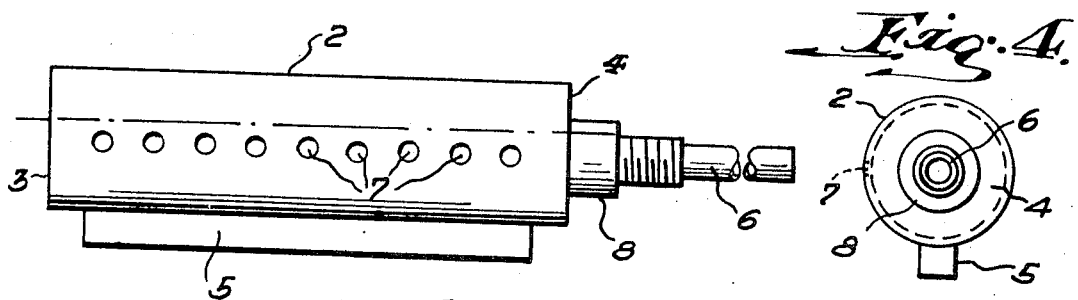
FIGURE 3 shows a side elevation of the effluent trough of FIGURE 2.
FIGURE 4 shows an end elevation of the trough of FIGURE 3.

Referring now in detail to the drawing, the settling tank 1 may be of any suitable shape; its function is to receive liquid from the sewage treatment system and maintain same in a quiescent state to permit the solids in said liquid to fall to the bottom of the tank for discharge from the system. The clear liquid at the top of the tank, being free of solids, is discharged to a stream, sewer or other convenient receiver. Whenever such settling tank is in an exposed position the liquid-air surface of the said tank may be in a state of turbulence and to minimum discharge of solids its is desirable to withdraw liquid from as large a portion of surface as possible avoid creation of currents tending a carry excessive amounts of solids out with the effluent.

In the present invention a stabilized effluent trough, comprised of a hollow enclosure having closed end portions and closed side walls connecting said end portion. As shown the settling tank 1 is circular or of other desired shape. The effluent trough, indicated generally as 2, comprises a hollow enclosure extending across the tank 1 to adjacent the side walls thereof. Opposite ends of the trough are closed by suitable solid end walls 3 and 4. Extending longitudinally of at least one side wall of the trough 2 are a plurality of suitably spaced openings 7 for admission of clear effluent into the trough. Extending longitudinally beneath the bottom of trough 2 is a suitable weight 5 to maintain the openings 7 below the liquid-air surface of the liquid in the tank 1. One end wall 4 of the tank is provided with a suitable opening through which a suitable pipe 6 extends to carry the fluid within the trough to a suitable point of discharge for the clear effluent within the trough 2. Any suitable means may be employed to secure pipe 6 to the end wall of trough 2 and to the side wall of the tank 1.

Preferably the connection between trough end wall 4 and the side wall of the tank includes a ball and socket joint 8 of suitable strength and conventional design to permit the trough 2 to rise and fall and to have limited partial rotation with the surface of the liquid in the tank 1. Such a ball and socket joint permits the trough 2 to move with the surface of the liquid in the settling tank. Such a ball and socket joint is a must when the sewage treatment system is employed upon a naval or other sea-going vessel. Such a joint 8 would be located in relation to tank 1 to maintain the torugh openings 7 just below the air-surface level of the effluent in settling tank 1 when the vessel is in quiet waters. Thus, trough 2 will have a limited range of movement in both a vertical plane and horizontal plane and a partial rotation about ball-joint 8 so as to move with and in the approximate plane of the air-liquid surface in the settling tank during all conditions of turbulence in the liquid within tank 1.

Any splashing of the effluent over or into the top surface of trough 2 cannot deposit suspended solids into the closed top surface of trough 2. Customarily the settled solids are constantly removed from the bottom of the settling tank so that effluent splashing over the top of trough 2 would be substantially free of solids.

I claim:

1. In a trough for removal of the clear effluent from a settling tank of a continuous flow sewage treatment system in combination, a hollow elongated body portion having closed opposite end walls providing an enclosure for flotation upon the surface of the effluent in the settling tank.

a plurality of spaced apertures in at least one side wall of said trough for admission of effluent into the interior of said trough, weight means depending from said body portion of the trough for positioning the side wall apertures therein for admission of effluent adjacent the air-surface plane thereof, and an effluent outlet member connecting the interior of said trough with the exterior of a side wall of said settling tank.

2. The effluent removal trough of claim 1 wherein said effluent outlet member includes a ball-joint providing for movement of the trough relative to and concurrent with changes in the air-surface plane of the effluent in said settling tank.

3. The effluent removal trough of claim 1, wherein said trough extends transversely of a major portion of the air-surface plane of effluent in said settling tank.

References Cited

UNITED STATES PATENTS

| | | | |
|---|---|---|---|
| 1,135,139 | 4/1915 | Rankin | 137—578 X |
| 1,528,003 | 3/1925 | Yarnall | 137—578 |
| 2,734,637 | 2/1956 | Fisher | 210—251 |
| 2,742,424 | 4/1956 | Saddington et al. | 210—525 |
| 3,369,664 | 2/1968 | Bahan | 210—83 |

REUBEN FRIEDMAN, *Primary Examiner.*

JOHN ADEE, *Assistant Examiner.*

U.S. Cl. X.R.

137—578; 210—540